United States Patent
Miura et al.

(10) Patent No.: US 7,678,737 B2
(45) Date of Patent: Mar. 16, 2010

(54) DEWATERING PROMOTER AND METHOD FOR PRODUCTION THEREOF

(75) Inventors: Seihachiro Miura, Tagajo (JP); Yoshihiro Niikura, Tokyo (JP)

(73) Assignees: Seihachiro Miura, Miyagi (JP); Etsuko Miura, Miyagi (JP); Patent Technology Development Inc., Tokyo (JP)

( * ) Notice: Subject to any disclaimer, the term of this patent is extended or adjusted under 35 U.S.C. 154(b) by 312 days.

(21) Appl. No.: 11/661,143

(22) PCT Filed: Aug. 18, 2005

(86) PCT No.: PCT/JP2005/015073

§ 371 (c)(1),
(2), (4) Date: Feb. 26, 2007

(87) PCT Pub. No.: WO2006/022188

PCT Pub. Date: Mar. 2, 2006

(65) Prior Publication Data

US 2008/0020929 A1      Jan. 24, 2008

(30) Foreign Application Priority Data

Aug. 26, 2004   (JP)   ............................ 2004-247528

(51) Int. Cl.
 *B01J 20/22*  (2006.01)
 *A01K 29/00*  (2006.01)
(52) U.S. Cl. ...................... 502/401; 119/171
(58) Field of Classification Search ................ 502/401; 162/142; 119/171
 See application file for complete search history.

(56) References Cited

U.S. PATENT DOCUMENTS 5,823,139 A * 10/1998 Ito ............................ 119/171
6,334,841 B1   1/2002 Letourneur
7,038,104 B1 * 5/2006 Eifling et al. ............... 604/374
2003/0216492 A1 * 11/2003 Bowden et al. .............. 524/47

FOREIGN PATENT DOCUMENTS

| JP | 58-143807 | 8/1983 |
| JP | 8-276105 | 10/1996 |
| JP | 9-216000 | 8/1997 |
| JP | 11-19698 | 1/1999 |
| JP | 2001-121199 | 5/2001 |
| JP | 2001-302377 | 10/2001 |
| JP | 2003-88900 | 3/2003 |
| JP | 2003-95769 | 4/2003 |
| JP | 2003-238278 | 8/2003 |
| JP | 2005-246146 | 9/2005 |

OTHER PUBLICATIONS

"*Thujopsis dolobrata.*" Dictionary.com definition, viewed on Mar. 6, 2009 at http://dictionary.reference.com/browse/Thujopsis%20dolobrata?qsrc=2888 .*
"*Journal of Sewerage, Monthly*", vol. 21, No. 13, pp. 80-86 and p. 95 (1998) (Japanese language).
"*Journal of Resources and Environment*", vol. 34, No. 9, pp. 25-33 and p. 96 (1998) (Japanese language).

* cited by examiner

*Primary Examiner*—Timothy C Vanoy
*Assistant Examiner*—Daniel Berns
(74) *Attorney, Agent, or Firm*—Wenderoth, Lind & Ponack, LLP

(57) ABSTRACT

A dewatering promoter which comprises a mixture of (A) a fine wood flour activated by a mechanochemical treatment and (B) a highly active cellulose fiber or a product formed by a grinding treatment of the mixture; and a method for producing the dewatering promoter which comprises adding the highly active cellulose fiber to the wood flour, in a ratio of more than 10% relative to the total mass of the wood flour and the highly active cellulose fiber, and subjecting the resultant mixture to a grinding treatment for at least 30 minutes. The above dewatering promoter can be produced at a low cost, and allows the reduction of the cost required for waste water treatments such as the disposal of a great amount of sludge.

27 Claims, No Drawings

DEWATERING PROMOTER AND METHOD FOR PRODUCTION THEREOF

TECHNICAL FIELD

The present invention relates to a dewatering aid which is effective in increasing the dewatering ratio in the case of dewatering treatment of sludges contained in industrial waste water and household waste water.

BACKGROUND TECHNOLOGY

While a variety of dewatering aids are employed for concentration of sludges in industrial waste water and household waste water, a method is known as one of them which is the use of waste paper, for example, in which low-grade waste paper and colored waste paper of high utilization value for reclaimed paper are crushed to have a particle diameter of about 0.25 to 1 mm to be admixed in a proportion of 10 to 50% by mass relative to the solid matter in the sludge and dewatering is conducted under a squeezing pressure of 0.05 to 0.30 MPa by utilizing a belt press or a screw press (see non-patent documents 1 and 2).

Besides, proposals were made heretofore for the dewatering method in which sludge is admixed with a coagulant and crushed waste paper to form a coagulated sludge and this coagulated sludge is supplied to a belt press-type dewatering machine provided with a cloth in circulatory running between a gravity dewatering part and a compression dewatering part to effect dewatering wherein the blending amount of waste paper and the running speed of the cloth are controlled to stabilize the water content of the dewatered cake (see patent document 1), a sludge treatment method in which an organic sludge is blended with 1 to 20 weight % of disintegrated pulp relative to the sludge SS followed by a concentration procedure (see patent document 2), a dewatering method of sludges in which the sludge is coagulated by admixing-with a coagulant and the coagulated sludge is subjected to primary dewatering followed by blending of waste paper as a dewatering aid to be subjected to secondary dewatering (see patent document 3), the composting method in which the sludge produced in an excrement processing yard is admixed with an inorganic salt as a coagulant to undertake dewatering followed by the admixture of the dewatered cake with pulverized shells to adjust the pH and further addition of crushed waste paper to improve the air permeability for multiplication of aerobic microorganisms so as to effect decomposition of the organic matter and absorption of the malodor (see patent document 4) and others.

It is almost impossible in these sludge-dewatering methods by utilizing waste paper, however, that the water content of sludgy animal feces or sewage sludges and sludges from industrial waste water should be decreased from 90% by mass or higher to 70% by mass or lower and, if possible, the sludge must be blended with at least 20% by mass or, depending on the case, at least 30% by mass of waste paper relative to the sludge so that handling thereof is unavoidably troublesome due to an increase of the amount of the dewatered cakes as the defective points.

Patent document 1: Japanese Patent Kokai 9-216000 (claims and elsewhere)
Patent document 2: Japanese Patent Kokai 11-19698 (claims and elsewhere)
Patent document 3: Japanese Patent Kokai 2001-121199 (claims and elsewhere)
Patent document 4: Japanese Patent Kokai 2001-302377 (claims and elsewhere)
Non-patent document 1: "Journal of Sewerage, Monthly" vol. 21, No. 73, pp 80-86
Non-patent document 2: "Journal of Resources and Environment" 1988, vol. 34, No. 9, pp 25-33

DISCLOSURE OF THE INVENTION

Under the above circumstances, one of the inventors formerly proposed the use of, as a dewatering aid, high-activity cellulose fibers consisting of fine pulp fibers having a diameter of 10 to 30 μm and a length of 500 to 1000 μm as imparted with mechanochemical activity by mechanical shearing (Japanese patent application 2004-56927) but, when the starting material used there is waste paper, pretreatment such as ink removal treatment and the like must be undertaken and the mechanical shearing must be conducted under controlled conditions so that the manufacturing cost of the dewatering aid is unavoidably increased leading to a defect that, in the disposal of a large amount of sludge, the expenses are so great due to the high cost of the dewatering aid.

The present invention has been completed with an object to provide, by overcoming these defects, a low-cost dewatering aid so as to decrease the treatment costs required in the disposal of a large amount of sludge and other waste water treatments.

The inventors have continued extensive investigations in order to develop an efficient and still inexpensive dewatering aid arriving, as a result thereof, at a discovery that, when the aforementioned high-activity cellulose fibers are blended with a material obtained by fine pulverization and activation of wood chips, which are discarded as unutilized or subjected to incineration heretofore, by a mechanochemical treatment and blended, the cost can be decreased without decreasing the dewatering efficiency and that the fine powder as a shaving dust produced in sanding of wood-made products can be utilized as such for the aforementioned activated fine wood flour leading to the present invention on the base of these discoveries.

Namely, the present invention provides a dewatering aid comprising a blend of (A) a fine wood flour activated by a mechanochemical treatment and (B) high-activity cellulose fibers or a grinding-treated material of the blend and also provides a preparation method of the dewatering aid characterized in that a wood flour is admixed with high-activity cellulose fibers in a proportion not smaller than 10% based on the total mass amount of the wood flour and the high-activity cellulose fibers followed by a grinding treatment for at least 30 minutes.

In the following, the present invention is described in further detail.

The fine wood flour used as the component (A) in the inventive dewatering aid is not particularly limitative including any wood flours from coniferous trees and broadleaf trees as well as monocotyledonous plants having woody stems or, namely, bamboo flours. The coniferous trees include, for example, Japanese cedar (*Cyptomeria japonica*), Japanese red pines (*Pinus densiflora*), Yezo spruce (*Picea jezoensis*), todomatsu (*Abies sachalinensis*), Oregon pines (*Pseudotsuga menziesii*), hemlock spruce (*Tsuga heterophylla*), Sitka spruces and others and the broadleaf trees include, for example, paulownia trees (*Paulownia tomentosa*), linden (*Tilia japonica Simonkia*), Japanese beeches (*Fagas crenata*), makabas (*Betula maximowicziana*), katsura trees (*Cercidiphyllum japonicum*), maple trees, Japanese oaks (*Quercus crispula*), zelkova trees (*Zelkova serrata*), shirakashi (*Quercus myrsinaefolia*), red lauans (*Shorea negrosensis*), apitong (*Dipterocarpus grandiflorus*), Japanese timber bamboos (*Phyllostachys bambsoides*), Hedge bamboos (*Bambusa multiplex*), bamboo grasses and others.

While these wood flours are employed as the component (A) in the present invention, a pulverized material of woods from thinning or cutting debris from wood workings or materials for discarding such as the saw dusts occurring in the course of wood sawing can also be utilized.

It is necessary that these wood flours are employed as the inventive component (A) in the form of a fine wood flour activated mechanochemically by the addition of a mechanical shearing force to such wood flours.

The "mechanochemical" here implied is a phenomenon in which a mechanical energy is added to a solid substance to cause collapsing with formation of active points leading to occurrence of chemical reactivity, to which not only the increase in the surface area due to collapsing but also accumulation of the internal energy by the mechanical energy added are correlated.

The application of a mechanical energy here can be conducted by pulverization or grinding in a dry state or in a wet state by using a vibration ball mill, rotary ball mill, rod mill, attrition mill, jet mill, microatomizer, high-speed stirrer and the like but it is particularly preferable to effect grinding in a dry state by using an attrition mill. This pulverization or grinding should be continued preferably until the fine wood flour obtained has a particle diameter of 1 to 100 µm or, preferably, 10 to 50 µm while the treatment time taken therefor is usually at least 30 minutes or, preferably, 1 to 3 hours.

As observed on an electron microscope, conventional wood flours such as saw dusts have a honeycomb structure but the component (A) in the present invention should desirably have been subjected to the mechanochemical treatment until the honeycomb structure has been destroyed. Particularly preferred are the shaving dusts occurring in sanding with a drum sander, belt sander, wild belt sander and the like as the final finishing step in the manufacture of plywood boards (veneer boards) and the shaving dusts generated by sand blasting in the finishing step of wood working products because they are powders of extreme fineness and a powerful mechanical energy has been applied thereto in the course of grinding.

When the wood flour contains a flour of hiba (*Thujopsis dolabrata*) or hinoki (*Chamaecyparis obtusa*) trees or a bamboo flour imparting a bactericidal effect and deodorant effect, it is possible to prevent rotteness and malodor generation of the dewatering-treated material over a long period of time. The proportion of content of a flour of hiba or hinoki trees in this case is sufficient with 5 to 30% by mass based on the overall amount of the wood flour.

While, in the next place, high-activity cellulose fibers are employed as the component (B) to be blended with the aforementioned component (A), the same is prepared, for example, by subjecting cellulose fibers in a state as dispersed in water or in a dried state to the application of mechanical energies by stirring or by grinding until at least 50% by mass of the cellulose fibers based on the total mass amount thereof have been comminuted to have dimensions of 10 to 30 µm in diameter and 400 to 1000 µm in length.

The pulp fibers used as the base material in this case can be freely selected from wood pulps such as alkaline wood pulps, sulfite pulps, chemiground pulps and semi-chemical pulps used as conventional paper-making base materials and paper-making pulps such as bagasse pulps, hemp pulps, bamboo pulps, bast pulps, straw pulps and the like but waste paper pulps are preferred for use from the standpoint of regeneration and efficient utilization of resources.

It is in many cases that various impurities and undisaggregated fibers are intermixed in the aforementioned paper-making pulps so that those to be used as the base material are subjected in advance to the removal thereof by screening in order to upgrade the purity as cellulose fibers to at least 97% or, preferably, to at least 99%. It is preferable that the fibers are used after fibrillation of the fibers by further beating.

While the waste paper pulp is used by simply soaking with water for disaggregation of individual fibers, a requirement is that; like in the case of conventional paper reclaiming, an ink-removal treatment is undertaken in advance so as to remove additives for paper making such as coloring pigments, extender pigments, sizing agents and the like to upgrade the purity as the cellulose fibers to at least 97% or, preferably, to at least 99%. The ink-removal treatment here can be conducted, for example, by digestion with addition of an alkali followed by settling and separation of impurities from the cellulose fibers and collecting the cellulose fibers floating in the aqueous solution. It is optional, in order to accelerate ink removal, to add a dispersing agent such as surfactants, sulfonated oils, bentonite, sodium metasilicate and the like.

Nextly, the high-purity cellulose fibers are subjected to a mechanochemical treatment to form high-activity cellulose fibers and this mechanochemical treatment is conducted, for example, by subjecting the high-purity cellulose fibers to shearing in water until the fine pulp fibers having a diameter of 10 to 30 µm and a length of 500 to 1000 µm are obtained under application of a mechanical energy. Since the high-activity cellulose fibers obtained in this way are subject to the variation of the phenomenon of luminescence (photons) directly after the mechanochemical treatment, it is possible to find the degree of activation by irradiating the same with light such as ultraviolet light to measure the photons emitted. It is preferable that the high-activity cellulose fibers used in the present invention exhibit a photon measurement value which is at least 1.5 times higher than that before the treatment by irradiation with ultraviolet light after the mechanochemical treatment and analysis of the phenomenon of luminescence immediately after the irradiation on an extremely weak luminescence measuring instrument.

Such preferable high-activity cellulose fibers are marketed from, for example, Reselber Co. under a registered tradename of "Reselber".

The dewatering aid of the present invention is a blend of the component (A) with the component (B) in a proportion of (B) exceeding 10% or, preferably, in a proportion of at least 40% based on the total mass of both components.

The blending can be performed by stirring or shaking the component (A) and the component (B) in a dry state in a desired proportion to be uniformly dispersed but it is preferable that the uniform dispersion is conducted for at least 30 minutes under grinding of the blend of both components.

Although a certain dewatering-promoting effect can be obtained even by the single use of the component (A) alone or, for example, by the single use of a waste wood flour occurring in the sanding of plywood boards, the effectiveness obtained by blending with the component (B) is equivalent to or rather higher than that when the component (B) is used singly.

It is also possible in this case that, in place of the fine wood flour activated by a mechanochemical treatment, as the component (A), a coarse wood powder having a particle diameter of 300 to 1500 µm is used and the same is compounded with the component (B) and subjected to a grinding treatment until the same becomes a fine powder having a particle diameter of 1 to 100 µm or, preferably, 5 to 50 µm to effect mechanochemical activation concurrently with blending.

With regard to the high-activity cellulose fibers of the component (B), the fineness accomplished by a treatment as a single material is limited because, if too fine, the activity is rather decreased so that it is essential, when used as a single material, that the dimensions of the fibers to be used are within the aforementioned ranges while, when rendered fine in a state as blended with the component (A), the activity is never decreased even if the fine powdery blend obtained has a so fine particle diameter of 1 to 100 µm so as to be advantageous of using in a fine powdery condition.

When a waste sludge such as a sewage sludge is dewatered by using the dewatering aid of the present invention, the dewatering aid is added in an amount of 5 to 35% by mass or, preferably, 10 to 20% by mass relative to the mass amount of the solid matter therein and thoroughly blended. By this treatment, the solid matter in the sewage water is converted into sludge-formed lumps and separated.

In the next place, an organic polymer coagulant is added to the sewage water containing the sludge-formed lumps as an aqueous solution of 0.1 to 0.5% by mass concentration. The amount of addition in this case is selected in the range of 0.1 to 20% by mass or, preferably, 0.5 to 10% by mass based on the mass of the solid matter content in the sewage water. The organic polymer coagulant usable here includes nonionic, cationic or amphoteric synthetic polymer coagulants.

The nonionic synthetic polymer coagulant is exemplified, for example, by polyacrylamides, polyethylene oxides and urea-formalin resins and the cationic synthetic polymer coagulant is exemplified, for example, by polyaminomethyl acrylamides, polyvinylimidazolines, chitosans, ionen-based copolymers and epoxyamine-based copolymers while the amphoteric synthetic polymer coagulant is exemplified, for example, by lecithin-based amphoteric surfactants, decomposed casein-based amphoteric surfactants and the like.

Those particularly preferable among the above include copolymers of acryloyloxyalkyl trialkylammonium salts or methacryloyloxyalkyl trialkylammonium salts and copolymers of these ammonium salts with acrylamide. Suitable molecular weight of these polymers or copolymers is in the range of 3000 to 100000.

These synthetic polymer coagulants are marketed, for example, as a liquid polymer coagulant "E-513" and "E-555" (each a product by HYMO Co.).

It is optional according to need that, when coagulation of a sludge with the organic synthetic polymer coagulant cannot be conducted to a sufficient extent, inorganic polymer coagulants are employed in combination. The inorganic polymer coagulants include, for example, iron(ill) polysulfate, iron (III) polychloride, aluminum polychloride, aluminum polysulfate and the like. These inorganic polymer coagulants are added to the sewage sludge in a proportion of 1.0 to 20 times or, preferably, 2.0 to 5.0 times relative to the used amount of the organic polymer coagulants usually in the form of an aqueous solution of 5 to 15% by mass concentration.

Since the composition of the sewage sludges is subject to variation depending on the environment of their formation and seasons, it is necessary to adequately increase or decrease the amounts of use of the dewatering aid and the organic polymer coagulants according to the composition within the aforementioned ranges.

In conducting disposal of sewage sludges, the order of addition of the dewatering aid and the organic polymer coagulant is an important factor and the dewatering aid is first added under stirring to form a sludgy state followed by the addition of the organic polymer coagulant. If this adding order is reversed, the dewatering effect is decreased. In order to form the sludgy state, vigorous stirring for at least 1 minute or, preferably, for 3 to 5 minutes is essential.

In the next place, an organic polymer coagulant is added to the thus formed sludge under stirring leading to successive formation of flocs so that formation of flocs to a full extent is followed by a liquid squeezing treatment. The length of time taken for this floc formation should be at least 2 minutes or, usually, is sufficient with 3 to 10 minutes although a further extension of the treatment time is optional, if necessary.

The material for disposal after full formation of flocs in this way is then subjected to liquid squeezing by means of, for example, screw press method, belt press method or pressure filtration method. The pressing pressure in this case is usually selected within the range of 30 to 100 kPa or, preferably, about 50 kPa or higher. Although methods by using a pressure lower than above such as the vacuum dewatering method can be used, the dewatering performance of the dewatering aid is exhibited more highly as the pressure is increased so that it is preferable to work with a liquid squeezing machine which works under a pressing pressure as high as possible.

The use of the inventive dewatering aid is not limited to the sewage sludges but it can be used for the disposal of various industrial waste waters including waste water from marine-products processing, waste water from foodstuffs, waste water from paper making, excrements of animals and others to accomplish efficient dewatering down to a water content of 65% or lower.

BEST MODE FOR CARRYING OUT THE INVENTION

In the following, the best mode for practicing the present invention is described by way of examples but the present invention is never limited by these examples.

REFERENCE EXAMPLE

High-purity cellulose fibers (impurity content 1% by mass or less, diameter 30 to 100 µm, length 2 to 2.5 mm) reclaimed from corrugated board waste paper were subjected to grinding for 1 minute or for 3 minutes in a grinding machine (manufactured by Akimoku Tekko Co., product name "Wood Crusher K3000") for mechanochemical activation to obtain Sample 2 (diameter 25 to 35 µm, length 1 to 1.5 mm) or Sample 3 (diameter 10 to 13 µm, length 0.8 to 1.0 mm).

A chemiluminescence test was undertaken as follows for the Samples 2 and 3 obtained in this way and the untreated high-purity cellulose fibers (Sample 1).

A 10 mg portion of the sample taken in a stainless steel-made Petri dish of 50 mm diameter was irradiated for 10 seconds with LED-UV (wavelength 375 nm) and then subjected to the measurement of the number of photon emission, after 1 second in the atmospheric air at room temperature (24° C.), with an extremely weak luminescence measuring instrument (manufactured by Tohoku Electronic Industrial Co., registered tradename "Chemiluminescence Analyzer MLA-GOLDS").

The results are shown in Table 1.

TABLE 1

| Sample | Number of photons as measured | Proportion to number of untreated photons as measured |
|---|---|---|
| Sample 1 | 2260 | 1 |
| Sample 2 | 2610 | 1.15 |
| Sample 3 | 3830 | 1.69 |

Example 1

The high-activity cellulose fibers (Sample 3 obtained in Reference Example) and a fine flour of lauan (a powder generated in sander finishing of plywood boards, average particle diameter 30 µm) were blended in the mass proportions shown in Table 2, respectively, and ground for 60 minutes by using an attriter [manufactured by Ishikawa Kojo Co., product name "Ishikawa-shiki Raikaiki AGA" to prepare a finely powdered dewatering aid (average particle diameter 30 µm).

Twenty liters of a sewage sludge (water content 96% by mass) taken from the sewage disposal plant of Sen-en Clean Center were admixed with 80 g of the aforementioned dewatering aid (corresponding to 10% by mass relative to the solid content in the sludge) and stirred for 2 minutes to form a sludgy state followed by the addition of 520 ml of a 0.2% aqueous solution of a polymer coagulant (a product by Asada Chemical Industry Co., product name "Ishifloc ICD3832") (corresponding to 1.3% by mass solid content relative to the solid content of the sludge) and stirring for 3 minutes to find formation of flocs in the sludge.

The thus treated sewage sludge was then dewatered by using a hand squeezer for 10 minutes under a pressure of 8 kg/cm$^2$ to obtain a dewatered cake of which the water content was determined.

Table 2 shows the properties of the flocs there and the water content of the dewatered cakes obtained.

In the Table, the evaluation of the forms of the flocs has the following meanings.
(1) Size
　A: average diameter 10 mm or larger
　B: average diameter 5 mm or larger but smaller than 10 mm
　C: average diameter 3 mm or larger but smaller than 5 mm
　D: average diameter smaller than 3 mm
(2) Hardness
　A: shapes retained but not depressed by finger pushing
　B: shapes retained but depressed by finger pushing
　C: shapes retained but finger thrust
　D: soft and shapes not retained
(3) Feeling by clasping
　A: firmly claspable
　B: barely claspable
　C: not claspable at all sludgy state followed by the addition of 2.0 liters of a 0.28% by mass aqueous solution of a liquid amphoteric polymer coagulant (a product by Hymo Co., tradename "E-513") (corresponding to 0.60% by mass relative to the solid content in the excrements) and stirring for about 3 minutes.

By this treatment, flocs were formed and became separated from the filthy water portion. Nextly, this treated matter was subjected to dewatering at 2.4 rpm revolution with a screw press-type sludge dewatering machine (manufactured by ShinMaywa Industries, Ltd., product name "SSP-1000").

In this way, dewatered cakes of a water content of 63.5% by mass were obtained. The flocs here had properties including the size of B, hardness of B and the feeling by clasping of B.

Example 3

Twenty liters of waste water scums after delubrication (water content 93.3% by mass) coming from the water treatment plant in the Cooperative Association of Marine Products Processors at Shiogama City Group Area were admixed with 200 g of the dewatering aid used in Example 1 (Sample No. 5) (corresponding to 11.5% by mass relative to the solid content in the scums) and stirred for 5 minutes at 2200 rpm followed by the addition of 8.7 g of an amphoteric polymer coagulant (a product by Asada Chemical Industry Co., tradename "Paraloc 410K101") as a 0.2% by mass aqueous solution and

TABLE 2

| Sample No. | Composition of dewatering aid (% by mass) | | Property of floc | | | Water content of dewatered cake (% by mass) |
|---|---|---|---|---|---|---|
| | Wood flour | High-activity cellulose fibers | Size | Hardness | Feeling by clasping | |
| 1 | 20 | 80 | A | B | B | 57.7 |
| 2 | 40 | 60 | A | B | B | 61.5 |
| 3 | 50 | 50 | A | B | B | 61.5 |
| 4 | 60 | 40 | A | B | B | 61.5 |
| 5 | 80 | 20 | B | B | B | 64.3 |
| Control | 0 | 100 | B | B | B | 57.5 |

As is clear from Table 2, the dewatering capacity of the high-activity cellulose fibers can be satisfactorily retained even by compounding with the wood flour and, different from the high-activity cellulose fibers in the fibrous form, moreover, addition can be performed in a powdery form leading to rather improved properties of the flocs as formed.

Comparative Example

The dewatering treatment of the sewage sludge was undertaken in the same conditions as in Example 1 excepting for the use of 25% by mass of fibers resolved from waste paper in place of the dewatering aid in Example 1 to find that the properties of the flocs included the size of D, hardness of D and feeling by clasping of C and 81.5% by mass of the water content in the dewatered cakes formed by squeezing.

Example 2

Twenty liters of sludgy animal excrements (water content 95.3% by mass) discharged out of a Swinery T were admixed with 200 g (corresponding to 21.3% by mass relative to the solid content in the excrements) of the dewatering aid used in Example 1 (Sample No. 5) and stirred for 2 minutes to form a further stirred for 3 minutes to cause floating of the flocs. The properties of these flocs included the size of A, hardness of B and feeling by clasping of B.

In the next place, waste water containing these flocs was subjected to dewatering treatment with the same screw press as used in Example 2 to obtain residue cakes with a water content of 55% by mass.

INDUSTRIAL UTILIZABILITY

With regard to the dewatering aid of the present invention, wood flours heretofore discarded as unutilized can be used as a component of the dewatering aid so that the cost for the base materials can be decreased. By using this dewatering aid, the water-containing sludges produced from a variety of living waste water and industrial waste water can be dewatered to have water content of 65% or lower. Accordingly, the sludge after treatment with this dewatering aid can be used as a raw material of composts. By virtue of the volume reduction to about one-half by decreasing the water content, usually, to 65% or lower, an advantage is obtained in the subsequent disposal of waste materials by incineration and land-filling that the amount of treatment can be greatly decreased. Accordingly, the dewatering aid of the present invention can be satisfactorily used for the purpose of dewatering of sludges in disposal of a variety of waste water.

The invention claimed is:

1. A dewatering aid consisting essentially of a blend of (A) a fine wood flour activated by a mechanochemical treatment and (B) high-activity cellulose fibers.

2. The dewatering aid according to claim 1 in which the component (A) is a fine wood flour containing a fine wood flour of hiba (*Thujopsis dolabrata*) or hinoki (*Chamaecyparis obtusa*) in a proportion of 5 to 30% by mass.

3. The dewatering aid according to claim 1 in which the blending proportion of the component (B) is larger than 10% based on the total mass amount of the component (A) and component (B).

4. The dewatering aid according to claim 1 in which the component (A) is a fine shaving dust powder generated in sanding of a wooden product.

5. The dewatering aid according to claim 4 in which the fine shaving dust powder generated in sanding of wooden products contains from 5 to 30% by mass of fine wood flour of hiba or hinoki.

6. The dewatering aid according to claim 1 in which the mechanochemical treatment comprises adding mechanical energy to a solid substance to cause collapsing with formation of active points leading to occurrence of chemical reactivity.

7. The dewatering aid according to claim 1 in which the component (B) is cellulose fibers activated by the mechanochemical treatment.

8. The dewatering aid according to claim 7 in which the cellulose fibers activated by the mechanochemical treatment are high-activity cellulose fibers consisting essentially of fine pulp fibers having a diameter of 10 to 30 μm and a length of 500 to 1000 μm which have been implied with mechanochemical activity by shearing using a machine.

9. The dewatering aid according to claim 3 in which the blending proportion of the component (B) is from 20% to 80% based on the total mass amount of the component (A) and component (B).

10. A dewatering aid consisting essentially of a grinding-treated material of a blend of (A') a fine wood flour activated by a mechanochemical treatment and (B) high-activity cellulose fibers.

11. The dewatering aid according to claim 10 in which the component (A') is a fine wood flour containing a fine wood flour of hiba (*Thujopsis dolabrata*) or hinoki (*Chamaecyparis obtusa*) in a proportion of 5 to 30% by mass.

12. The dewatering aid according to claim 10 in which the blending proportion of the component (B) is larger than 10% based on the total mass amount of the component (A') and component (B).

13. The dewatering aid according to claim 10 in which the component (A') is a fine shaving dust powder generated in sanding of a wooden product.

14. The dewatering aid according to claim 10 in which the mechanochemical treatment comprises adding mechanical energy to a solid substance to cause collapsing with formation of active points leading to occurrence of chemical reactivity.

15. The dewatering aid according to claim 10 in which the component (B) is cellulose fibers activated by the mechanochemical treatment.

16. The dewatering aid according to claim 15 in which the cellulose fibers activated by the mechanochemical treatment are high-activity cellulose fibers consisting essentially of fine pulp fibers having a diameter of 10 to 30 μm and a length of 500 to 1000 μm which have been imparted with mechanochemical activity by shearing using a machine.

17. The dewatering aid according to claim 12 in which the blending proportion of the component (B) is from 20% to 80% based on the total mass amount of the component (A') and component (B).

18. The dewatering aid according to claim 10 in which the grinding-treated and activated material has a particle diameter of 1 to 100 μm.

19. The dewatering aid according to claim 18 in which the grinding-treated and activated material has a particle diameter of 10 to 50 μm.

20. A method for the preparation of a dewatering aid consisting essentially of a blend of (A) a fine wood flour activated by a mechanochemical treatment and (B) high-activity cellulose fibers,
said method comprising admixing a wood flour with high-activity cellulose fibers and subjecting the mixture to a grinding treatment for at least 30 minutes,
wherein the proportion of the high-activity cellulose fibers is not lower than 10% based on the total mass of the wood flour and the high-activity cellulose fibers.

21. The method for the preparation of a dewatering aid according to claim 20 in which the wood flour is a fine shaving dust powder generated in sanding.

22. The method for the preparation of a dewatering aid according to claim 21 in which the wood flour is a blend of a fine shaving dust powder generated in sanding and a wood flour of hiba or hinoki.

23. A method for the preparation of a dewatering aid consisting essentially of a grinding-treated material of a blend of (A') a fine wood flour activated by a mechanochemical treatment and (B) high-activity cellulose fibers,
said method comprising admixing a wood flour with high-activity cellulose fibers and subjecting the mixture to a grinding treatment for at least 30 minutes,
wherein the proportion of the high-activity cellulose fibers is not lower than 10% based on the total mass of the wood flour and the high-activity cellulose fibers.

24. The method for the preparation of a dewatering aid according to claim 23 in which the wood flour is a coarse wood flour having a particle diameter of 300 to 1500 μm.

25. The method for the preparation of a dewatering aid according to claim 24 in which the coarse wood flour contains a wood flour of hiba or hinoki.

26. The method for the preparation of a dewatering aid according to claim 24 in which the grinding-blending is conducted until the coarse wood flour is converted into a fine powder having a particle diameter of 1 to 100 μm.

27. The method according to claim 23, wherein the grinding treatment time is 1 to 3 hours.

* * * * *